(12) United States Patent
Plagemann et al.

(10) Patent No.: US 9,699,217 B2
(45) Date of Patent: *Jul. 4, 2017

(54) PRIVACY AWARE CAMERA AND DEVICE STATUS INDICATOR SYSTEM

(71) Applicant: Google Inc., Mountain View, CA (US)

(72) Inventors: Christian Plagemann, Palo Alto, CA (US); Abraham Murray, Scituate, MA (US); Hendrik Dahlkamp, Palo Alto, CA (US); Alejandro Jose Kauffmann, San Francisco, CA (US); Varun Ganapathi, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/093,340

(22) Filed: Apr. 7, 2016

(65) Prior Publication Data

US 2016/0226917 A1    Aug. 4, 2016

Related U.S. Application Data

(63) Continuation of application No. 13/664,533, filed on Oct. 31, 2012, now Pat. No. 9,317,721.

(51) Int. Cl.
*G06F 21/00* (2013.01)
*H04L 29/06* (2006.01)
(Continued)

(52) U.S. Cl.
CPC .......... *H04L 63/20* (2013.01); *G06F 21/629* (2013.01); *G06F 21/82* (2013.01); *H04L 63/101* (2013.01)

(58) Field of Classification Search
None
See application file for complete search history.

(56) References Cited

U.S. PATENT DOCUMENTS

| 6,442,525 B1 | 8/2002 | Silverbrook et al. |
| 6,618,117 B2 | 9/2003 | Silverbrook |

(Continued)

FOREIGN PATENT DOCUMENTS

| CN | 101729565 | 6/2010 |
| CN | 102088462 | 6/2011 |

OTHER PUBLICATIONS

Widener, Patrick; Schwan, Karsten; Bustamante, Fabian E. Differential Data Protection for Dynamic Distributed Applications. Proceedings, 19th Annual Computer Security Applications Conference. Pub. Date: 2003. http://ieeexplore.ieee.org/stamp/stamp.jsp?arnumber=1254344.*

(Continued)

*Primary Examiner* — Jeremiah Avery
(74) *Attorney, Agent, or Firm* — Fish & Richardson P.C.

(57) ABSTRACT

A privacy indicator is provided that shows whether sensor data are being processed in a private or non-private mode. When sensor data are used only for controlling a device locally, it may be in a private mode, which may be shown by setting the privacy indicator to a first color. When sensor data are being sent to a remote site, it may be in a non-private mode, which may be shown by setting the privacy indicator to a second color. The privacy mode may be determined by processing a command in accordance with a privacy policy of determining if the command is on a privacy whitelist, blacklist, greylist or is not present in a privacy command library. A non-private command may be blocked.

20 Claims, 8 Drawing Sheets

(51) Int. Cl.
*G06F 21/62* (2013.01)
*G06F 21/82* (2013.01)

(56) References Cited

U.S. PATENT DOCUMENTS

| | | | | |
|---|---|---|---|---|
| 7,260,221 | B1* | 8/2007 | Atsmon | G06F 21/35 |
| | | | | 380/247 |
| 7,312,845 | B2* | 12/2007 | Silverbrook | B41J 2/14 |
| | | | | 355/18 |
| 7,453,492 | B2 | 11/2008 | Silverbrook | |
| 7,581,249 | B2 | 8/2009 | Bussiere et al. | |
| 7,605,940 | B2 | 10/2009 | Silverbrook | |
| 7,665,104 | B2 | 2/2010 | Maehara | |
| 7,707,413 | B2 | 4/2010 | Lunt et al. | |
| 7,877,494 | B2 | 1/2011 | Carlton et al. | |
| 7,894,635 | B2* | 2/2011 | Kim | G06F 21/32 |
| | | | | 235/382 |
| 8,234,220 | B2 | 7/2012 | Weiss | |
| 8,316,237 | B1* | 11/2012 | Felsher | H04L 9/0825 |
| | | | | 380/282 |
| 2004/0257431 | A1 | 12/2004 | Girish et al. | |
| 2007/0011023 | A1 | 1/2007 | Silverbrook | |
| 2008/0043108 | A1 | 2/2008 | Jung | |
| 2009/0185797 | A1 | 7/2009 | Ogasawara | |
| 2009/0287930 | A1* | 11/2009 | Nagaraja | H04L 9/08 |
| | | | | 713/171 |
| 2010/0097441 | A1 | 4/2010 | Trachtenberg et al. | |
| 2010/0205667 | A1* | 8/2010 | Anderson | G06F 3/013 |
| | | | | 726/19 |
| 2011/0143811 | A1 | 6/2011 | Rodriguez | |
| 2011/0145904 | A1* | 6/2011 | Pizano | G06F 21/32 |
| | | | | 726/7 |
| 2011/0276396 | A1 | 11/2011 | Rathod | |
| 2012/0084734 | A1 | 4/2012 | Wilairat | |
| 2012/0131183 | A1 | 5/2012 | Heidt et al. | |
| 2012/0150650 | A1 | 6/2012 | Zahand | |
| 2012/0222083 | A1 | 8/2012 | Vaehae-Sipil et al. | |
| 2013/0111600 | A1* | 5/2013 | Guenther | G06F 21/72 |
| | | | | 726/26 |
| 2013/0131465 | A1* | 5/2013 | Yamamoto | A61B 5/7271 |
| | | | | 600/301 |
| 2013/0133054 | A1* | 5/2013 | Davis | G06F 21/316 |
| | | | | 726/7 |

OTHER PUBLICATIONS

Jelicic, Vana; Magno, Michele; Brunelli, Davide; Bilas, Vedran; Benini, Luca. An Energy Efficient Multimodal Wireless Video Sensor Network with eZ430-RF2500 modules. 2010 5th International Conference on Pervasive Computing and Applications. http://ieeexplore.ieee.org/stamp/stamp.jsp?arnumber=5704091.*

Barton-Sweeney, Andrew; Lymberopoulos, Dimitrios; Savvides, Andreas. Sensor Localization and Camera Calibration in Distributed Camera Sensor Networks. 3rd International Conference on Broadband Communications, Networks and Systems. Pub. Date: 2006. Relevant pp. 1-10.

Computer Desktop Encyclopedia definition of "processor": http://lookup.computerlanguage.com/host_app/search?cid=C999999&term=processor&lookup.x=0&lookup.v=0.

Computer Desktop Encyclopedia definition of "processor": http://lookup.computerlanguage.com/host_app/search?cid=999999&term=processor&lookup.x=0&lookup.v=0.

Garcia-Morchon, Oscar; Falck, Thomas; Heer, Tobias; Wehrle, Klaus. Security for Pervasive Medical Sensor Networks. MobiQuitous '09. Pub. Date: 2009.

International Preliminary Report on Patentability for International Application No. PCT/US2013/066076, mailed May 14, 2015, 9 pages.

International Search Report and Written Opinion for International Application No. PCT/US2013/066076, mailed May 12, 2014, 11 pages.

Lie, David; Mitchell, John; Tekkath, Chandramohan A.; Horowitz, Mark. Specifying and Verifying Hardware for Tamper-Resistant Software. Proceedings, 2003 Symposium on Security and Privacy. Relevant pp. 166-177.

McCune, Jonathan M.; Perrig, Adrian; Reiter, Michael K. Seeing-ls-Believing: Using Camera Phones for Human-Verifiable Authentication. 2005 IEEE Symposium on Security and Privacy. Relevant pp. 110-124.

Morales, Roberto; Serna, Jetzabel; Medina, Manel; Luna, Jesus. CARMA: Composable-Adaptive Resource Management Authorization for Ubiquitous Environments. 2010 Sixth International Conference on Information Assurance and Security (IAS).

Noguchi, Hiroshi; Mori, Taketoshi; Sato, Tomomasa Human Daily Behavior Accumulation in Real Home Environment via Distributed Sensors in a Long Term. 2011 IEEE/SICE International Symposium on System Integration (Sii). Pub. Date: 2011. Relevant pp. 368-37 4.

Wangi, N.I. Cempaka; Prasad, R.V.; Niemegeers, I.; de Groot, S. Heemstra. Ad Hoc Federation of Networks (FedNets)—Mechanisms and Requirements. 2nd International Conference on Communication Systems Software and Middleware, 2007. COMSWARE 2007. Relevant pp. 1-6.

Office Action issued in Chinese Application No. 2013800656404, mailed on Mar. 24, 2017, 11 pages (English Translation).

* cited by examiner

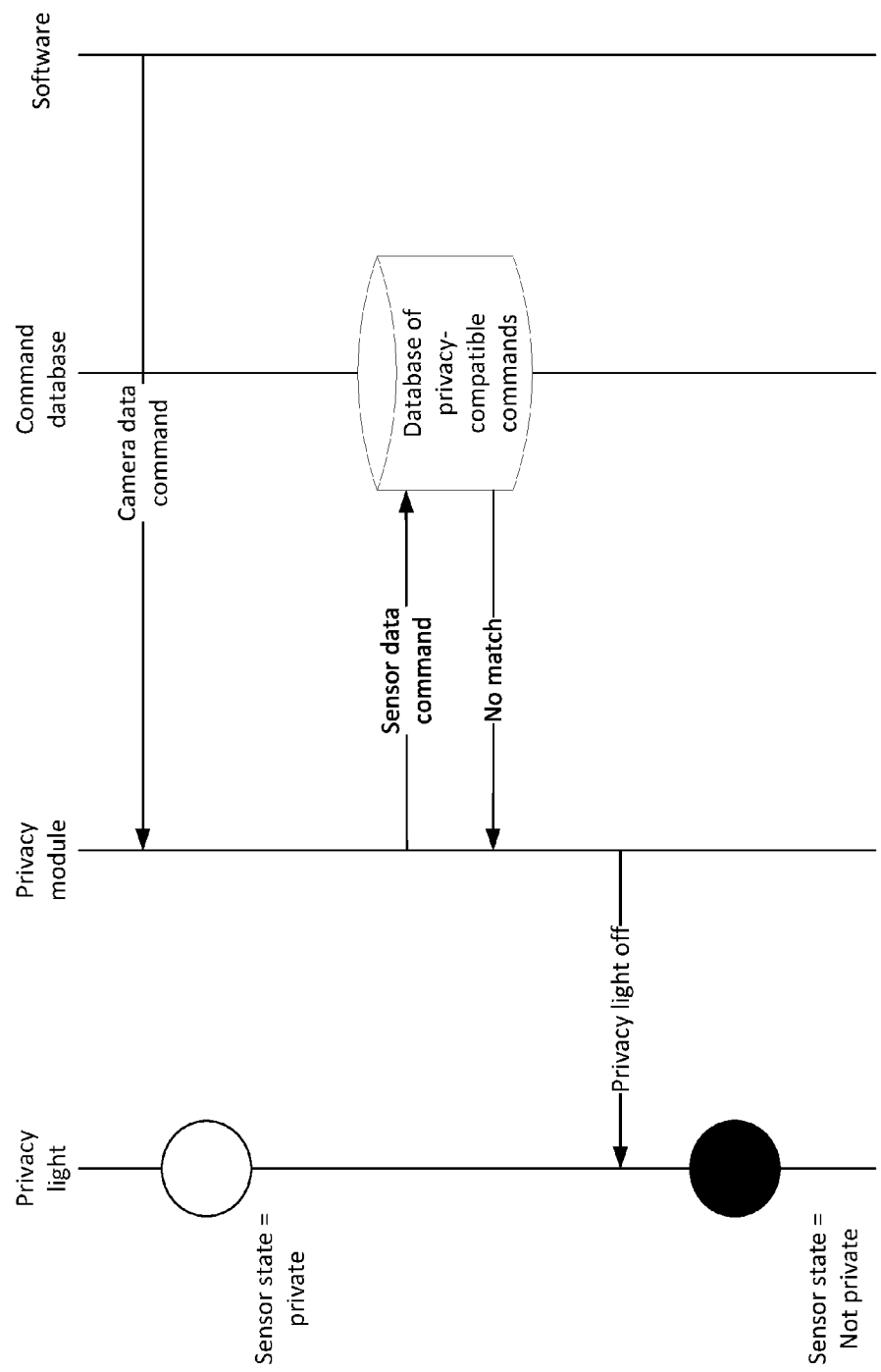

PRIVACY AWARE CAMERA AND DEVICE STATUS INDICATOR SYSTEM

CROSS-REFERENCE TO RELATED APPLICATIONS

This application is a continuation of U.S. application Ser. No. 13/664,533, filed Oct. 31, 2012, which is incorporated herein by reference.

BACKGROUND

Web cameras, digital cameras, microphones, or other digital recording devices have become pervasive, particularly in peoples' homes. Typically, such devices are utilized to participate in digital communications with remote locations. Software may be linked to these devices that allows for gesture or voice command recognition. In such a system, it may be desirable to have devices that listen or receive a video feed to monitor an environment for a gesture or voice command. However, it may be difficult for a user to determine when the system is in this monitoring state or when it is actively communicating or storing information.

Some current systems include an indicator that indicates if an input device has power. If the device has power, for example, a LED may be illuminated and indicate to the user that the device is on. However, such an indicator cannot show when data being gathered by an input device is used in compliance with a privacy policy, e.g., the data is used only internally, or if the date is being sent to a remote site without the authorization of the system user.

BRIEF SUMMARY

According to an implementation of the disclosed subject matter, a command to access data generated by a sensor may be received. The command may be determined to be impermissible by a privacy policy. Based on this determination, the state of a privacy indicator may be changed.

In an implementation, a command to access data generated by a sensor or from data provided by a sensor, such as a camera, may be received. The command may be compared to a library of known commands. The library of known commands may be a database of commands based on the generated data. The command may be determined to not match the library of known commands. Based on this determination, the state of a privacy indicator, such as a LED, may be changed.

A system is provided that can include a sensor, computer readable storage for storing a library of known commands, and processor. The processor may be connected to the computer readable storage. It may be configured to receive a command to access data generated by the sensor. The processor may compare the command to the library of known commands and determine that the command does not match the library of known commands. Based on this determination, the processor may change the state of a privacy indicator.

In an implementation, a privacy mode and a command to access data generated by a sensor may be received. The command may be compared to a library of known commands. The command may be determined to not match the library of known commands. The command may be prevented from accessing sensor data based on the determination that the command does not match the library of known commands.

A command to access data generated by a user may be received. The command may be determined to be associated with an application. A digital signature associated with the application may be verified. The digital signature may be determined to be invalid base on the verification of the digital signature associated with the application. The command may be determined to be not compatible with a privacy policy. The state of a privacy indicator may be changed based on based on the determination that the digital signature is invalid and that the command is not compatible with a privacy policy.

Additional features, advantages, and implementations of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

FIG. 7 shows how sensor data may be processed to change the status of a privacy indicator.

DETAILED DESCRIPTION

A secure privacy indicator such as a light is provided herein. The indicator may communicate to a user that a system is in a current privacy state. The privacy module that controls the privacy light may be secured by incorporating it as a component of a protected portion of software code that is not exposed to an end-user. For example, the software controlling the privacy indicator may be a component of a system kernel, that is, a place where the user has no access to the logic that determines the state of the indicator. The kernel module that controls the privacy state logic may appear as a camera driver. It may be distributed as part of an operating system.

According to an implementation disclosed herein, a change in the privacy status of a system may be detected by monitoring the activity of a sensor. If data from the sensor are being used to generate a command (such as a gesture command, a voice command, etc.) that is present in a database of commands that are used for control purposes, then the system may be considered to be in a private state. If, on the other hand, data from the sensor (such as images or sounds) are being, for example, transmitted to a remote location, stored or stored or transmitted to an unverified memory or destination, then the system may be determined to be in a non-private state. In the private state, the privacy module may maintain the privacy indicator in an inactive ("private") state. The privacy module may also actively prevent transmission or storage of data while it is in this state. If the privacy module detects, however, that a sensor such as a camera has begun to transmit or store data (e.g., by user activating a video communication software), then the privacy indicator state may be changed to active ("non-private"). For example, a privacy light on a camera may illuminate to signal to the user that a camera is not transmitting data it receives to a remote location (e.g., a computer other than the one to which the camera is connected). In some cases, an attempt to copy sensor data from the device to which the sensor is connected may also be identified as a non-private command. For example, an attempt to copy sensor data to a USB flash drive inserted into a laptop that contains a web camera may cause the privacy indicator on the web camera to indicate a non-private state. The privacy indicator may be changed to non-illuminated once it is determined that data are no longer being transmitted or stored to an unverified destination or memory.

Figure 1:
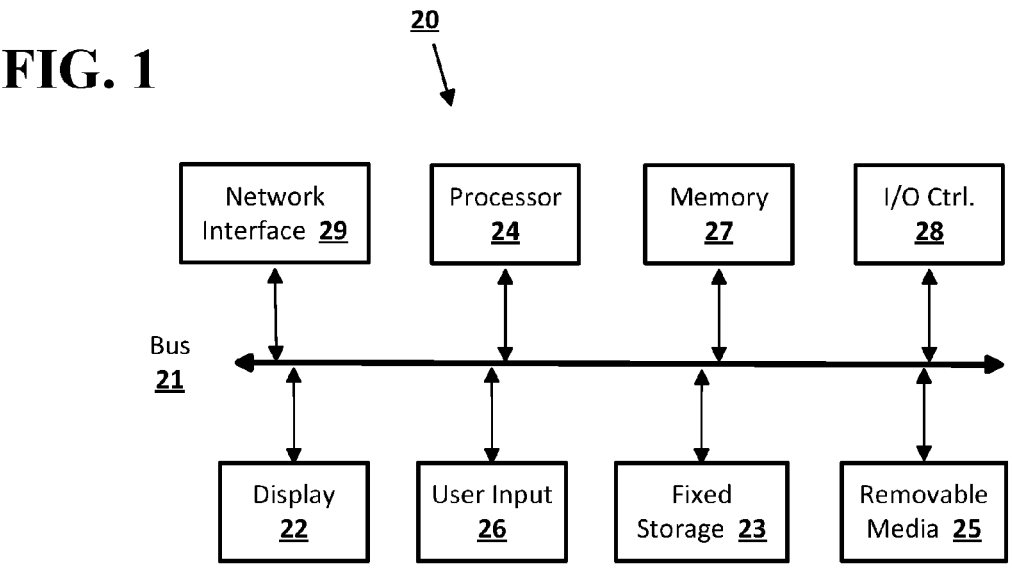
FIG. 1 shows a computer according to an implementation of the disclosed subject matter.

Implementations of the presently disclosed subject matter may be implemented in and used with a variety of component and network architectures. FIG. 1 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
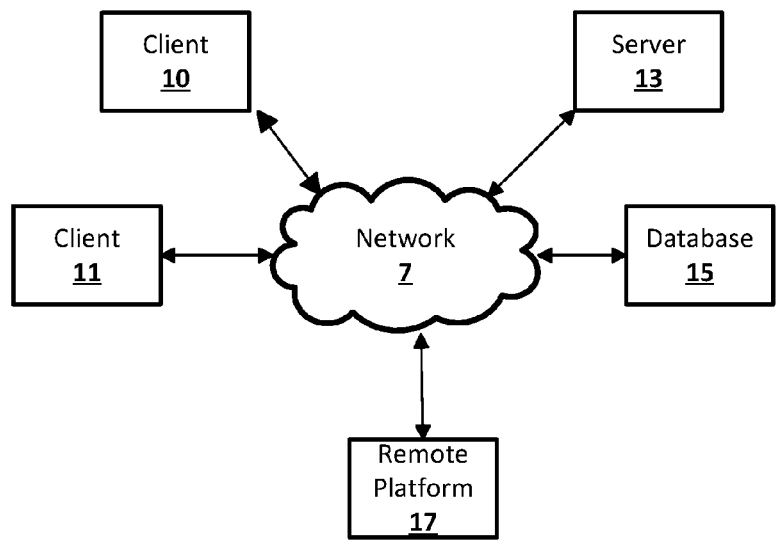
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

A command to access data generated by a sensor may be received. A sensor may include, for example, a microphone, a camera, an infrared sensor, a motion sensor, a light sensor, or a GPS device. Other sensors may be compatible with one or more of the implementations disclosed herein. A sensor may be used to scan an environment continuously or periodically, that is, data may be generated by the sensor over extended periods of time. For example, a camera may scan a room in which it is placed as a component of a gesture control system or a security system that employs face recognition technology.

Examples of a command include, without limitation, a gesture, an audio signal (e.g., voice command), a facial recognition, or a facial response such as an eye blink pattern, a wink, a smile, a head nod, or a head turn. Gesture recognition, for example, may be performed by extracting and analyzing camera data received from a sensor. In some instances, a single image frame may be sufficient for a gesture to be recognized. For example, a user may hold up a palm of one of her hands to a monitor, which may signify that the user would like the current program or video to stop or pause. A palm faced toward a screen may be captured in a single image frame. In other cases, a sequence of images may be required to discern a gesture. For example, a user may make a right-to-left page-swipe motion in front of a monitor to signal that the user would like to browse the next page of pictures in an online album. Because motion is involved, multiple frames may need to be pieced together (e.g., as a sequence) to ascertain the page-swipe motion. Upon generating potential gestures, a subsequent analysis may be performed to determine if the gesture is recognizable or ascribed to a given function. A skilled artisan will know techniques for extracting gesture information from camera data. In each of these examples, sensor data, such as data collected by a camera, may be accessed to generate gesture data that may or may not be matched to a gesture with an ascribed function in a gesture database. Thus, a command, such as to turn a web album or to stop a video from playing, may be generated from sensor data.

A command may include object detection or other gestures unrelated to a person's face or body. For example, a user may hold a soda can in a predetermined position that causes a camera to scan the product and open a web page for the product if the identity of the product can be gleaned from an image. A command may also refer to user interaction with a third party device such as a keyboard or a mouse being used to execute software on a remote device. For example, a user may launch video communications software on a laptop computer (e.g., remote device) using a mouse (e.g., third party device). The command to activate the video communications software may require access to camera and microphone data. Thus, more than one sensor's data may be accessed according to implementations disclosed herein. A command may include a sequence of known commands. For example, a user may perform multiple gestures in sequence, such as execute a hand wave and then point at a monitor or the user may point at the monitor and state, "on." The individual commands may be combined to form a command that is distinct from the individual commands themselves. For example, pointing at a screen may have a first function assigned to it and speaking the word "on" may have a second function assigned to it. The combination of pointing at the monitor and speaking the word "on" may cause a third function to happen.

Figure 3:
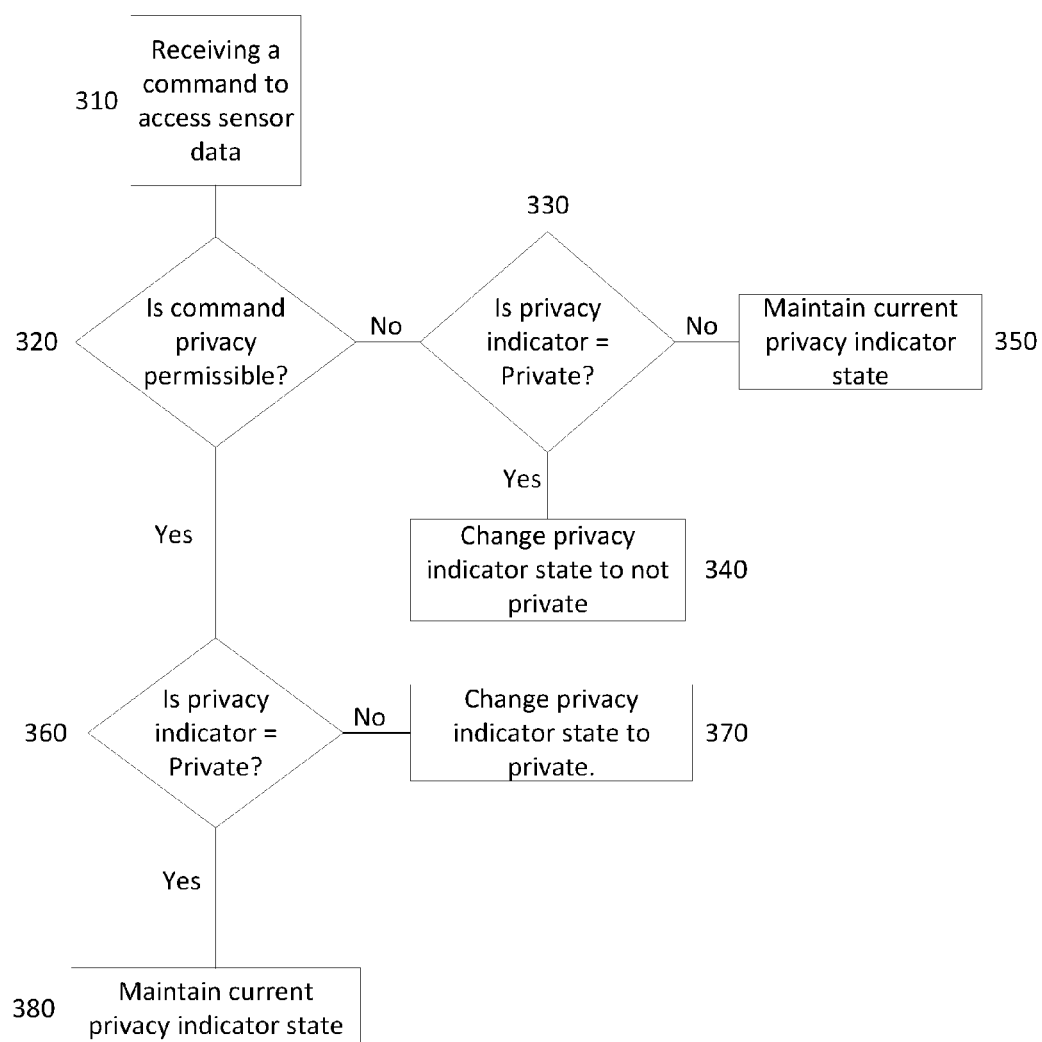
FIG. 3 is an example of a process for changing the status of a privacy indicator.

As shown in FIG. 3, a command can be received, 310. The command can be processed to determine if it is a private or non-private command (e.g., privacy status), 320. For example, it can be determined that the command is permitted by a privacy policy, that the command is on a list of private-type commands, etc. For example, a microphone on a device such as a laptop may be on continuously to be ready to receive voice commands whenever they are uttered by a user. For example, a user may issue a voice command such as "Turn on TV." The voice command can be recognized as a command to turn on the TV. The system may determine that a locally-processed command to turn on a TV does not pose a significant risk or is a low threat to a user's privacy.

It may be determined that a command is not permitted by a privacy policy, that the command is not on a list of private-type commands, etc. For example, a user may launch video communications software that accesses data provided by a camera to transmit it to a remote location or to store it. When the command to launch the software or a command to access the camera data is received from the application, it may be determined to be a non-private command or activity.

Another way in which the privacy status of a command can be determined is to check a digital signature associated with the command or set of commands or to check the privacy status (e.g., by verifying a digital signature of an application, type of application, or mode of the application with which the command is associated. If the digital signature of the command or set of commands (or of the application that issues the command) is verified as being valid, then the system can set the privacy status to "private." The system can verify the signatures by storing one or more digital certificates that are associated with the application, type of application, mode of application, command, or set of commands. The certificates can be stored in a privacy key ring or can be stored as part of the library of known commands.

A storage device, a remote device, or a remote service (e.g., a cloud service) may also be digitally signed. For example, the system may verify the digital signature associated with a USB flash drive and may verify that storing sensor data to the flash drive is compatible with the privacy policy before storing sensor data to the drive. The system may also be configured to set a privacy indicator based on predetermined configurations such as a video communications application accessing data from the microphone only (no video), a home security application storing data only to a USB flash drive, etc. In the foregoing examples, each software and/or hardware component (e.g., the video communications application, the microphone, etc.) can be associated with digital signatures that can be verified by the system. A device or service may also have authorization removed. For example, a user may decide to sell a USB flash drive that currently has a valid digital signature. The user may revoke authorization for the flash drive to store or access sensor data from the user. Subsequent to revoking authorization for the user's system, the privacy indicator will reflect a non-private state if the flash drive attempts to access sensor data.

A remote service may store sensor data and, similarly, a device connected to a sensor may store sensor data if one or both are verified as described above. Reference to storage and transmission of sensor data leading to a non-private state may refer to an untrusted memory or destination. Determining whether a memory or destination is trusted may be performed by consulting the privacy policy which may include a database of trusted memory or destinations. The trusted memory or destinations may be specific to one or more applications or types of application. Each memory and destination can be associated with a digital signature that can be verified.

Returning to FIG. 3, the status of the privacy indicator may be changed depending on whether the received command is private or non-private and what the current status of the indicator is determined to be. If the received command is determined to be non-private or not permissible, 320, the status of the privacy indicator may be determined, 330. If the privacy indicator is determined to be in a private state, 330, then the indicator may be changed to reflect a non-private status, 340. If the privacy indicator is determined to be in a non-private state 330, then that state may be maintained in its current state, 350. If the command is determined to be private or privacy permissible 320, the status of the privacy indicator may be determined, 360. If the privacy indicator is determined to be in a non-private state 360, then the privacy indicator may be changed to reflect a private status 370. If the privacy indicator is determined to be in a private state 360, then the privacy indicator may be maintained in its current state, 380.

Figure 4A:
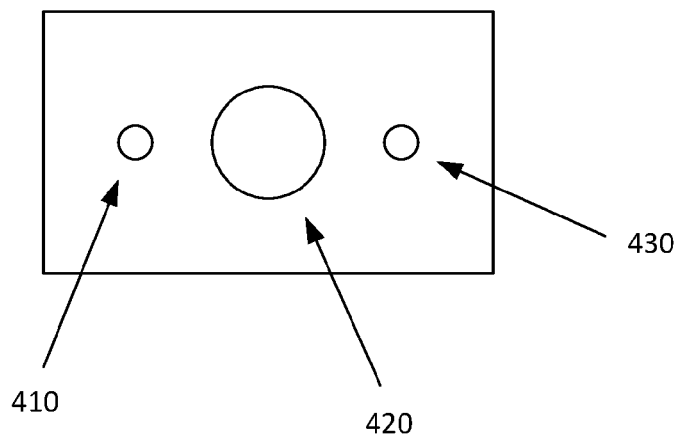
FIG. 4A is an example of a camera sensor with a power on/off indicator and a privacy indicator.
Figure 4B:
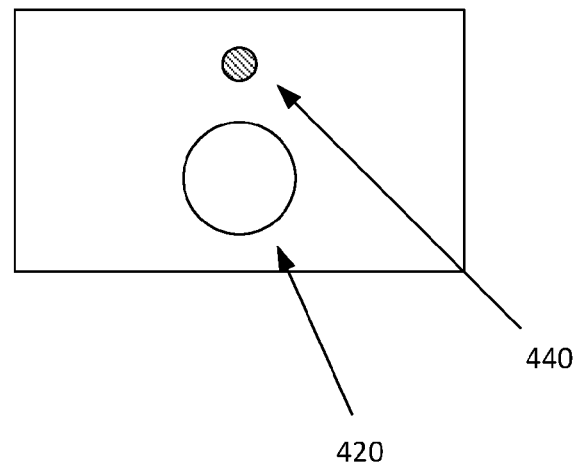
FIG. 4B is an example of a camera sensor with a privacy indicator illuminated in a color.
Figure 4C:
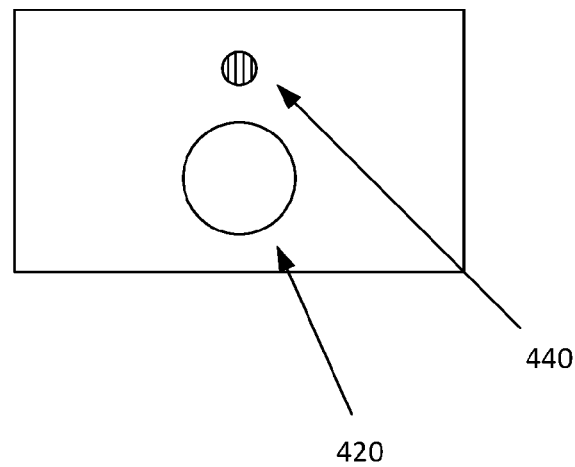
FIG. 4C is an example of the camera sensor shown in FIG. 4B with the privacy indicator illuminated in a different color due to a change in the privacy status of the sensor.

A privacy indicator may include, for example, a light, a LED, a system tray notice, an audible sound, or a tactile feedback. FIG. 4A shows a camera with an on/off indicator 410, a camera 420, and a privacy indicator 430. The on/off indicator 410 may be illuminated when the camera 420 is powered. The privacy indicator 430 may be a light such as a LED. The privacy indicator 430 may be activated or deactivated according to any of the implementations disclosed here. In some configurations, as shown in FIGS. 4B and 4C, the privacy indicator 440 may be illuminated at all times. Color may be used to indicate different privacy states. For example, FIG. 4B shows the privacy indicator 440 in a green color which may signal to the user that the user is in a private state, for example, the information the camera is collecting is not being stored, transmitted to a device unconnected to the sensor (e.g., camera) or same network as the sensor, or stored or transmitted to an unverified destination or memory. FIG. 4C shows the privacy indicator 440 in a red color, which may signal that the user is being recorded or that another device may be accessing the camera data. A privacy indicator may be a component of a sensor, for example an LED on a camera as shown in FIGS. 4A-4C, or it may be a stand-alone device. It may also be executed in software such as a system tray notification. In some configurations, a privacy indicator may be made to blink in different patterns to show different privacy states. For example, a continuous illumination of an LED privacy indicator may indicate that a sensor is in a private state while a blinking LED may indicate that the sensor is in a non-private state.

A privacy indicator may have an initial state that is established the first time a sensor is run, software, such as a driver, for the sensor is installed, or the first time a device to which a sensor is connected is activated. For example, a web camera may set an initial state of a LED privacy indicator upon being connected to a user's computing device and installing a camera driver, or software required for a sensor to operate. The initial state may also be established concurrently or subsequent to installation of the camera driver. For example, the camera driver installation itself may set the initial state of the sensor. In some configurations, the first time a sensor is used, for example for gesture recognition, a determination may be made as to whether or not a command is permissible according to the privacy policy. The indicator may be set according to the outcome of this determination. An initial state may indicate that the data generated by the sensor is not being stored in persistent storage or being transmitted to a remote entity e.g., to a device that physically separate from the device to which the sensor is a part or is directly connected, or to a device on a remote network.

The initial state of the privacy indicator may be set to a particular color to indicate the privacy state. A privacy indicator light may be set to green to indicate that the system is operating in a private mode or the privacy indicator may be set to red to indicate that the system is operating in a non-private mode. For example, a green light may indicate that the commands being received involving sensor data are on a list of privacy compatible commands. As long as the commands being processed are privacy compatible, the privacy indicator remains green. When a command is processed that is not on the list of privacy-compatible commands, the privacy indicator can be changed to show red to reflect that the system is in a non-private state.

Figure 5:
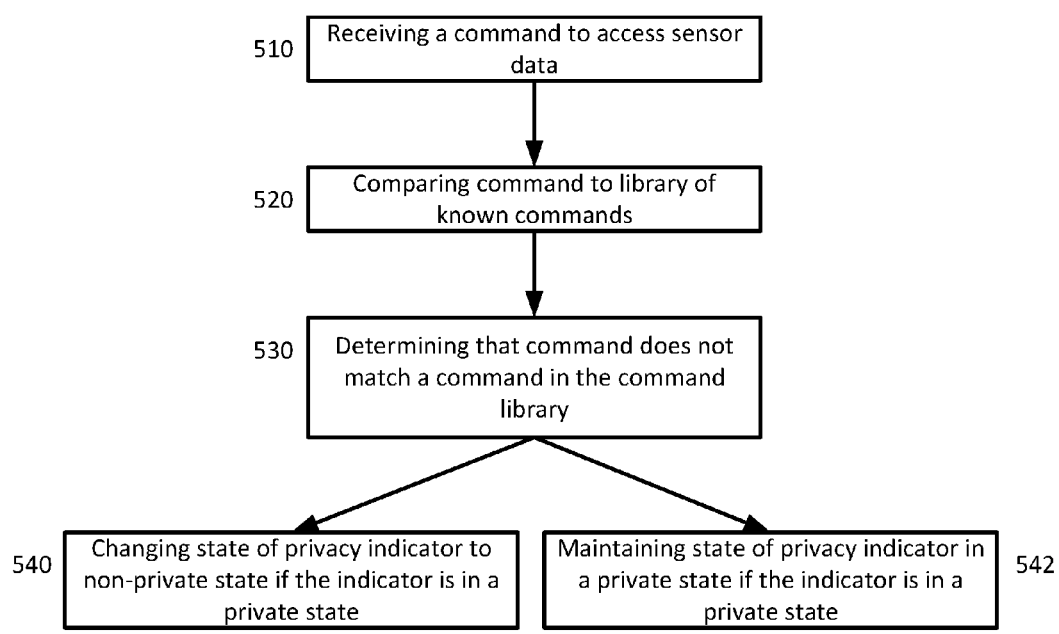
FIG. 5 is an example process for changing the status of a privacy indicator in response to a comparison of a command to a library of known commands.

In an implementation, as depicted in FIG. 5, a command to access data generated by a sensor may be received at 510. As described earlier, the command to access data may originate, for example, from a gesture that is detected by a sensor such as a camera or it may originate from software executed on a computing device. The command may be compared to a library of known commands at 520.

In some configurations, a library of commands may be maintained in computer readable storage or memory of a device that is protected from access by an end user or by executing software. A protected library may refer to a command library or software code that may not be tampered with by, for example, altering commands, adding commands, deleting commands, creating a trigger event for a separate machine readable code to be executed on the device upon receipt of the command, or replacing one or more components of the library or the entire library. The library of known commands may refer to a database of commands based on the data generated by the sensor. For example, a camera may actively observe an area for a gesture recognition or motion-activated system. The images provided by the camera when it is in a scanning state (e.g., the first level referred to earlier) may be used to generate gesture data which may be compared against the library of known commands. For example, a hand wave gesture may be associated with turning on the lights to a specified intensity for a specific user identified by facial recognition. The camera may provide a sequence of images that are buffered on a computing device. The buffering may occur in protected storage or memory. The sequence of images may be analyzed by a processor to identify a hand and to determine what, if any, command, is being issued by the hand gesture. The command may be determined to not match the library of known commands at 530. For example, the library of commands may contain a pattern or sequence that would signify a gesture, such as a hand wave, and that gesture may have a command assigned to it, such as to turn on the lights to a specified intensity.

In some configurations, comparing the command to a library of known commands may include verifying a digital signature associated with the command. A digital signature that does not match the library of known commands may refer to the determination that the digital signature associated with a command is invalid. For example, a cloud service may be authorized to access video or audio data from one or more sensors. A privacy indicator would remain in a private state or changed to reflect a private state. However, if a remote service was not digitally signed, then the privacy indicator may be changed to alert the user of the non-private state.

The library of commands may contain commands that would not compromise a user's privacy. For example, gestures that instruct a system to turn on lights, activate a game console, scroll through a web page, launch a web browser, set an alarm, run a program on an a laundry or kitchen appliance, or change a channel may be deemed to not violate a user's privacy. In this sense, the command library acts as a privacy command whitelist. Likewise, a command library may include a command that is non-private. In this way, the same or a separate command library acts as a privacy command blacklist. Likewise, a command can be greylisted, e.g., temporarily blocked, if the command is included in a greylist privacy command library. The greylisted command can be executed if certain subsequent commands are received or events occur. For example, a command can be greylisted (temporarily blocked), a warning can be displayed to the user, and if the user indicates that the command should be executed (e.g., gives permission to send video data from the camera via an identified application), then the command can be executed.

The determination of which commands may violate a user's privacy may be determined by a manufacturer, a user, or be based on one or more rules. For example, a rule may mandate that any use of the camera for an activity that allows access to camera data such that it causes the data to be stored locally, transmitted or stored to a device not connected to the user's network, or to be stored or transmitted to an unverified memory or destination may be deemed impermissible or non-private. Another rule may specify that executing a video chat program is impermissible or non-private according to a privacy policy.

In some instances, a camera may be on continuously. The user may hold up a toy to the camera. The sequence of images provided by the camera that contain the user holding up the toy may be analyzed and determined to be a command for a product search for the toy. In some instances, a product search may result in a web page of the toy's manufacturer being opened. The command, in such an instance, is a request to identify the product held up by the user and may be deemed permissible by a privacy policy and/or may be present in the library of known, "private" commands. Thus, the library of known commands is not limited to gesture recognition. Other commands, discussed here and above, may be present in the library such as launching or activating software that may not compromise a user's privacy (such as a solitaire game), reading a QR code and opening a web page related thereto, or facial recognition-based commands.

Based on the determination that the command does not match the library of known commands, the state of a privacy indicator may be changed at 540. A privacy indicator may be switched from one state to another, such as inactive to active, or be changed from one color to another. As described above, a privacy indicator may refer to any indication provided to a user that informs the user of the privacy state of the platform or one or more sensors associated with the platform. In some instances, a user may receive a software based notification such as a system tray notification that the privacy state has changed. In some configurations, multiple privacy indicators may be used. For example, a light on a camera may change from green to red when a user's privacy is no longer private. The user may also receive a system tray notice indicating the non-private state. For example, if video chat software is activated, a notice may appear on a computing device to which a camera is connected that the camera is now allowing access to its data by an application that stores and/or transmits the camera's data, or by a remote device unconnected to the same network as the camera or the device to which the camera is connected. Once the video communications application or video chat session has ended, the user may receive a system tray notice to indicate that the system is again in a private state. A privacy indicator on the camera may also change from red to green to reflect the private state.

In an implementation, a command may be blocked. For example, a user may request a particular privacy state be maintained. In some instances, the request may be received by a physical switch on a sensor such as a camera. The request may also be made by a software input or input that is received from a sensor. For example, a user may signal with a gesture that the user would like the camera to maintain a private state. Any subsequent command to have a sensor store or transmit data to an unverified memory or destination in a non-private manner may be blocked. For example a command to launch a video chat application may be blocked or the application may be denied access to camera and/or microphone data. Blocking may include preventing an application from storing or transmitting sensor data to, for example, a remote location or device not on the same network or connected to the sensor. In some instances, a command to maintain a private state may be received. Subsequent to the request, a malicious program may attempt to access sensor data which may cause a privacy indicator to change to indicate a non-private state. The malicious program's request may be blocked.

In an implementation, a privacy mode may be received. A privacy mode may refer to a private or non-private state. For example, a user may toggle a hardware switch on a webcam to instruct the device to which the camera is connected and the camera itself to deny access to the camera's data except for those applications, devices, or services that are compliant with a privacy policy or a library of known commands or that are otherwise verified. As another example, the user may make a selection in an operating system to maintain the system in a private state. The privacy mode may be configurable based on, for example, an individual or group of applications, type of application (e.g., communications software, video game software, word processing software, photo editing software, etc.), time of day, user accessing the system, data communications type, data communications destination, memory, or sensor type. For example, a user may select a privacy mode that directs the system to be maintained a private state. The user may issue a voice command to perform a web search. The audio data, containing the terms of the search, may be transmitted to a remote search service. The search service may be digitally signed and verified by the system. The audio data may, therefore, be transmitted and stored with the search service. If the remote search service was not verified, the audio data containing the query may not have been provided to the search service, regardless of how brief and temporarily the search service may have stored the query. Similarly, camera data may not be transmitted or stored to the search service because it may not be verified for that type of sensor data. Thus, the user may specify a privacy mode that may regulate sensor data access in a highly customized manner (e.g., specific applications or every device/software).

Subsequent to setting a privacy mode, a command generated by a sensor may be compared to the library of known commands and determined not to match. The command destination or memory to which the command may be stored may also be compared to a privacy policy to determine if the command is compatible with the privacy policy. The command may be determined to not match the library of known commands or to be incompatible with the privacy policy. The command may be prevented from accessing sensor data based on the determination that the command does not match the library of known commands or is incompatible with the privacy policy.

Figure 6:
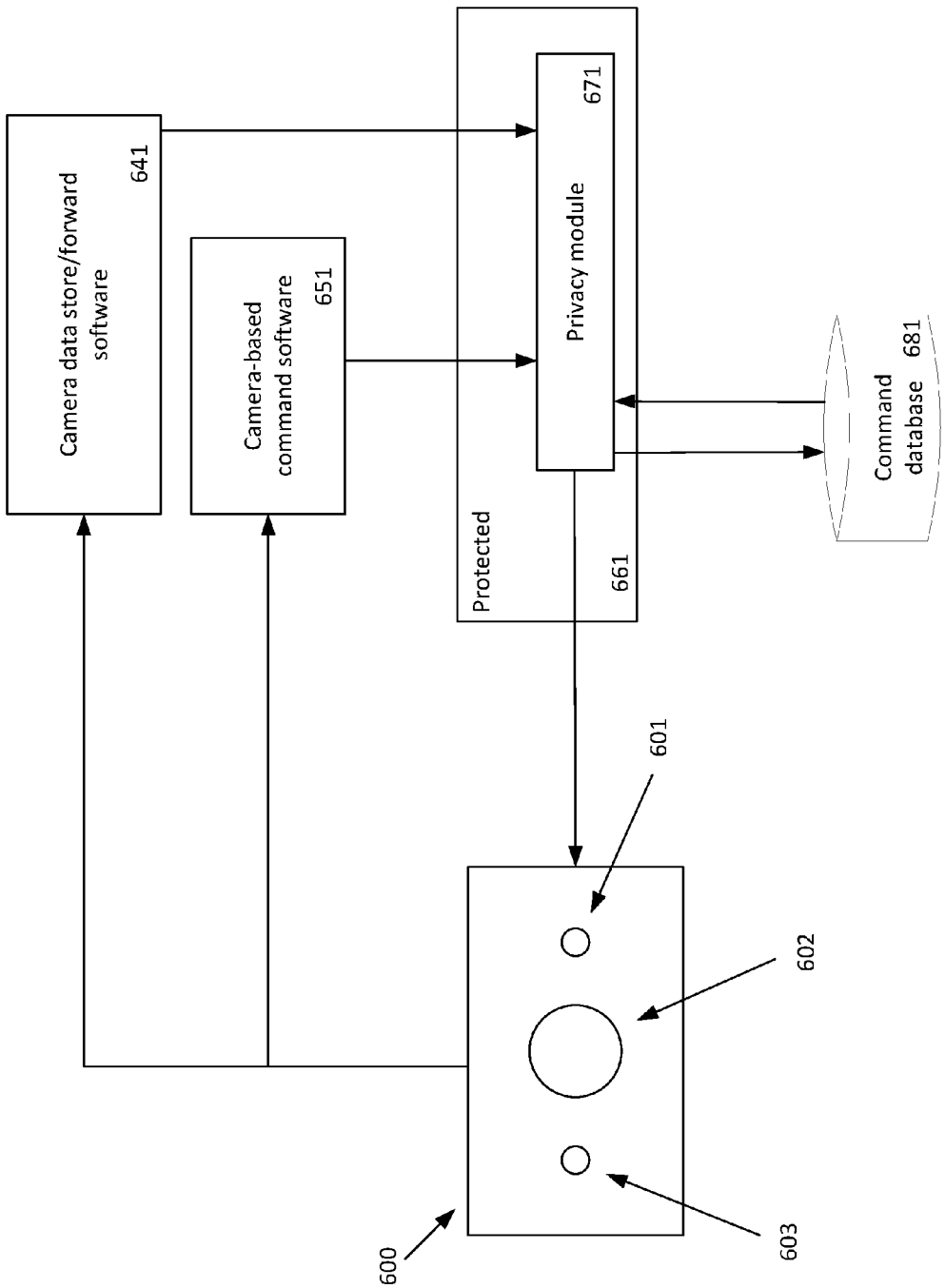
FIG. 6 is an example information flow to update the status of a privacy indicator according to the type of camera data that is provided.

FIG. 6 shows an example process for changing the state of a privacy indicator. In some configurations, a sensor may have the ability to perform the implementations disclosed herein. In other configurations, such as that depicted in FIG. 6, the sensor may send its data to a device that it is connected to and that device may determine whether a received command requires a change in the privacy indicator status. A sensor is provided in the form of a camera 600 in FIG. 6. The camera 600 has a camera lens 602, an on/off indicator 603 which illuminates whenever the camera 600 has power, and a privacy indicator 601, which is a LED that illuminates when the camera is in a non-private state. The camera may be connected to the device by, for example, USB or one or more wireless protocols such as Bluetooth. The camera 600 may transmit data to a device that is either directly or indirectly connected to it. A driver for the camera 600 may be installed on the device and make camera data available to the device to generate data for an image or sequence of images. For example, the camera driver may receive the raw camera data. The data may be in two forms. One form may be camera data may be privacy irrelevant, that is, it may contain gesture data (e.g., command) as indicated at 651. The other data form of camera data may be privacy sensitive, that is, it may be stored, forwarded, or transmitted to a device that may compromise a user's privacy as indicated at 641.

The determination of whether data are privacy irrelevant or sensitive may be performed using protected memory of a device. Protected memory or storage 661 may be used to preclude the possibility of altering the software contained therein by an end user or other application. For example, a software kernel is typically protected from alteration and may be suitable to perform the analysis and determinations required by one or more of the implementations disclosed herein. A kernel may be responsible for interfacing device hardware with an application and managing hardware resources. The protected memory 661 may have a privacy module 671 that may be a component of a system kernel. The privacy module 671 may determine whether the received camera data 641, 651 requires a change in the privacy indicator 601 status. The camera data 641, 651 may be buffered and analyzed in the protected memory 661 to generate gesture data, for example, which may be compared to a library of known gesture commands 681. Techniques for generating gesture data from camera image data or sequences thereof are known to a skilled artisan.

FIG. 6 depicts the library of commands 681 outside the protected memory 661. In some configurations, the library of commands 681 may be a component of the protected memory 661. The command database 681 may be queried with the generated gesture data (e.g., image or image sequences from the sensor) and return a match, if any. In some configurations, the command database 681 may also identify gestures as privacy sensitive or privacy irrelevant. For example, the privacy module 681 may determine that a gesture instructing the device to activate video chat software matches a command in the command database 681. The command database 681 may also identify this gesture as a request for privacy sensitive access to the camera data; in some instances the privacy module 671 may determine that the effect of activating video chat software would not comply with a privacy policy or would allow impermissible access to camera data. The privacy module 671 may change the status of the privacy indicator to reflect that a privacy sensitive action has been requested.

In some configurations, the privacy module 671 may determine that the command received from the sensor 600 (e.g., gesture) failed to match a known gesture in the database 681. If no match is detected, then the gesture may be deemed impermissible by the privacy module 671. The privacy module 671 may change the privacy indicator 601 from a private state to a non-private state. Subsequently, the privacy indicator 601 may be reverted to a private state to reflect that the command is no longer requesting or receiving access to camera data. For example, a command to initiate a video chat session may cause the privacy indicator 601 to illuminate. However, once the video chat session has ended, the privacy indicator 601 may be turned off because camera and microphone data are no longer being accessed. In some cases, a command may be blocked if it fails to match a command in the library of known commands 681. Thus, a command may cause the initiation of a program whose execution causes the privacy status of a user to change. Although the command itself may cease to exist in a brief instance, the effect of the command (e.g., launching a video chat session) may last longer and may cause the privacy indicator to remain in the altered state until the effect of the command ceases (e.g., the chat session ends).

In some instances, a user's hands or body may make a motion that is not recognized as a command. For example, if a user takes a drink from a glass, the motion of lifting the glass to the user's mouth may be received by the camera driver as camera data. However, the action may not be associated with a gesture because the user's hands or body are not in a particular position relative to the glass. In contrast, if the user holds the drink up to the sensor, it may signal to the camera that the user is interested in having the sensor collect data about the object the user is holding. The determination of what constitutes a command may be performed, for example, by an analysis module. The analysis module may be a component of the protected memory 661. The analysis module can process the command by submitting a query to a whitelist, blacklist, greylist or mixed privacy command library to determine the status of the command. For example, the command may be privacy-compatible, not privacy-compatible, or subject to greylisting. Likewise, the analysis module may apply a privacy policy, e.g., a set of rules to the command (along with other inputs, such as the intended destination to which sensor data is to be sent, type of user logged into the platform with the sensor, time of day, etc.). It may also perform other functions related to a sensor such as changing a camera's resolution or other image capture settings. The analysis module may send data to the privacy module 671. The analysis module may be a component of gesture recognition software and have the ability to discern a gesture from a background motion or an unintended gesture from a person. The analysis module may determine that a person sipping a drink does not constitute a command or gesture. However, the drink held up to a camera may be a request to identify the drink product. The command sent from the analysis module to the privacy module may identify the command as a product look-up request. The privacy module 671 may search the library of known commands and determine that the product look-up request is a permissible, privacy irrelevant activity. In some configurations, the functions attributed to or performed by the analysis module may be performed by the privacy module 671.

FIG. 7 shows an example of a process tree for changing the status of a privacy indicator. A privacy indicator may have an initial state or default state to indicate that a sensor is in a private state. In the private state, data transmitted by the sensor may not be subsequently transmitted or stored to an unverified destination or memory. Sensor driver software may receive data from one or more sensors. The data may be deemed a command. The command may be compared to the database of privacy compatible commands. If the command does not match, the command may be determined to be impermissible by the privacy module. The privacy module may change the sensor's state to indicate to the user that the sensor is in a non-private state.

Figure 8A:
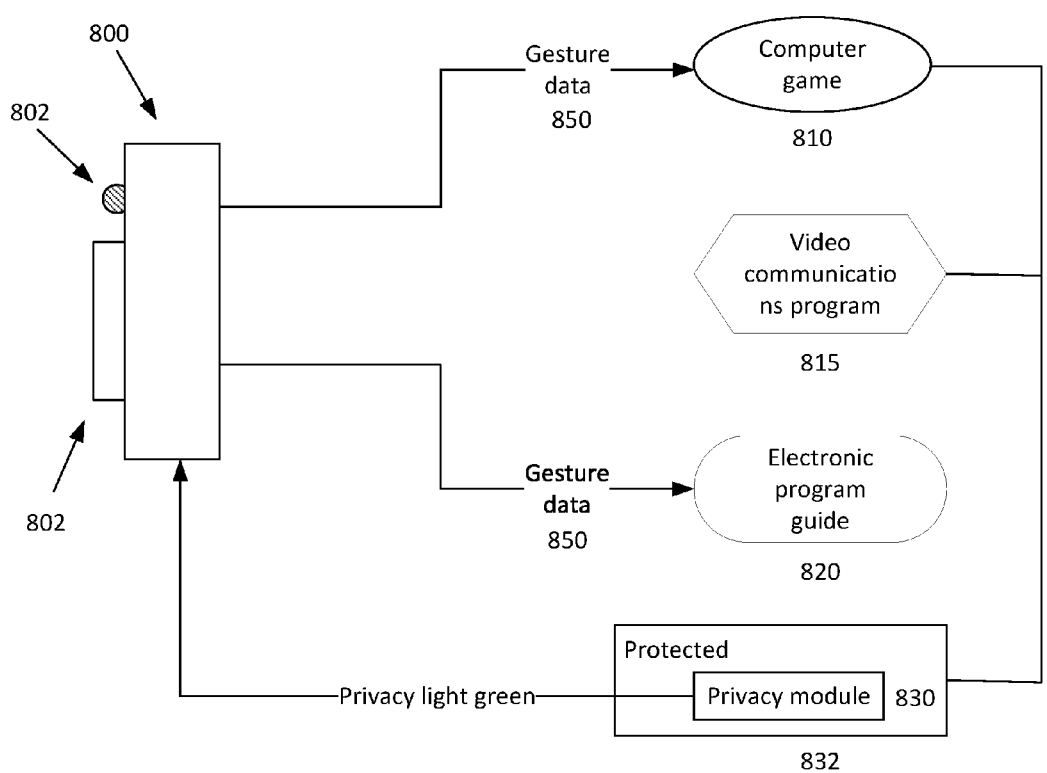
FIG. 8A shows a camera sensor used by multiple consumers. The consumers in FIG. 8A are utilizing gesture data from the camera sensor. The privacy indicator shows a privacy secure state.
Figure 8B:
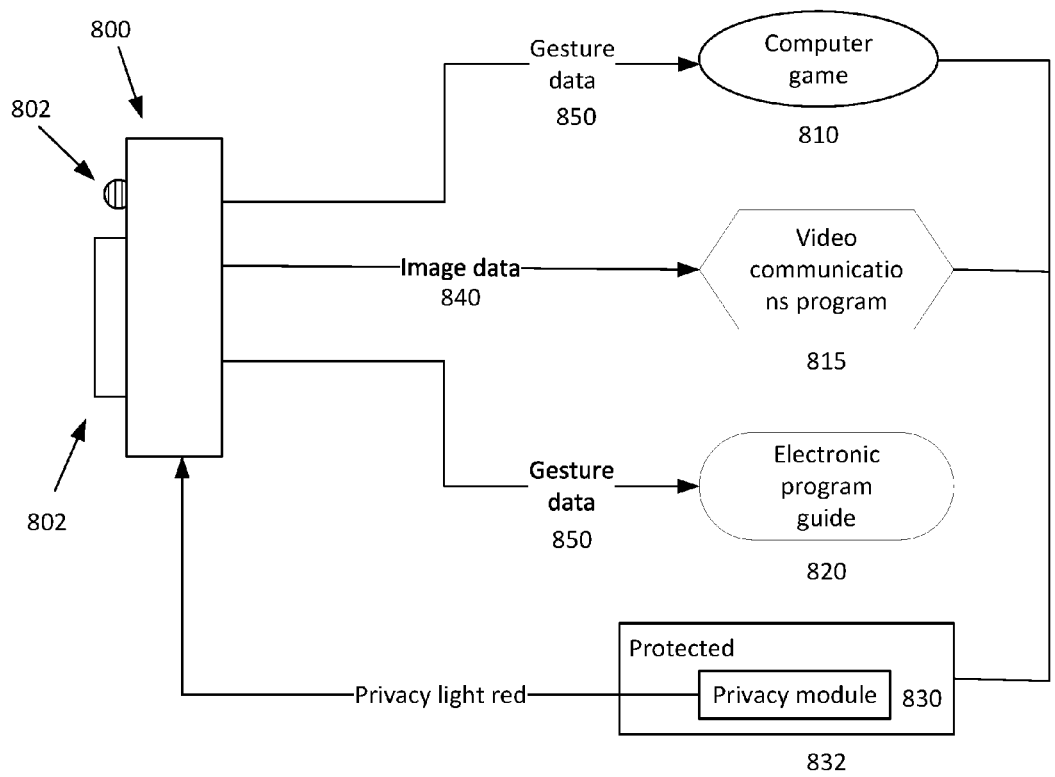
FIG. 8B shows a camera sensor used by multiple consumers. The video communications program is accessing image data for one of the consumers in FIG. 8B. The privacy module has changed the status of the privacy indicator to reflect that the system is now in a private state.

FIGS. 8A and 8B shows three examples of camera data access. A camera is shown with a privacy indicator 802 in one color (e.g., green) and a camera lens 804. Three different consumers are represented by a computer game 810, a video communications program 815, and an electronic program guide 820. In FIG. 8A, the privacy module 830, located in protected memory 832, may receive a request by the computer game 810 or the electronic program guide 820 to receive gesture data 850. The privacy module may determine that the gesture data are permissible in accordance with a privacy policy or because a gesture is found in a library of known commands. Thus, the privacy indicator may be maintained in a private state. The system may continue to check the status of the camera data being provided to the computer game 810 or the electronic program guide 820.

In FIG. 8B, a video communications program 815 may receive image data 840. The privacy module 830 may detect the transmission of image data 840 to the video communications program 815 or it may have detected the request to launch or initiate the video communications program 815 and determine that this action violates a privacy policy or that it is not present on a list of permissible commands. It may change the privacy indictor 802 to reflect a non-private state (e.g., change the privacy indicator to a red color) to alert the user that the user's camera 800 may be recording or transmitting camera data.

A variety of mechanisms may be utilized to secure the data connection between a sensor and a device to which the sensor is connected. Such a connection can indicate that the sensor is a component of a device, the sensor being physically connected to the device by a cable, or the sensor may be connected to the device by a wireless protocol (e.g., Bluetooth). A sensor may be connected to a device using USB. USB has one or more pipes that connect the device's USB controller to an endpoint on the sensor. The number of endpoints in a sensor may be determined by a manufacturer. A pipe between the host controller and the sensor may be opened or closed. A message pipe may be used to update a sensor status and a stream pipe may transfer sensor data to the host controller of the device. Some sensors may have multiple stream pipes. For example, a web camera may have a microphone and a camera that utilize separate stream pipes. Each pipe may be individually controlled. Addressing endpoints and regulating pipes are understood by a skilled practitioner.

The privacy module may update or change a state of a privacy indicator using a message pipe. The pipe's endpoint may be determined by the manufacturer of the sensor and access to it controlled by the privacy module. Similarly, the pipe that transfers data from the sensor to the device's host controller may be regulated by the privacy module. In a private state, the pipe used for transmission of sensor data may be open. If the privacy module determines that a command has been issued that may be incompatible with the library of known commands, then it may change the status of a privacy indicator on the sensor to alert a user and it may close the stream pip responsible for transmission of sensor data.

In an implementation, a system is provided that includes a sensor, a computer readable storage for storing a library of known commands, and a processor. The processor may be connected to the computer readable storage and configured to receive a command to access data generated by the sensor. It may compare the command to the library of known commands and determine whether or not the command matches any entry in the database containing the library of known commands. The library of known commands may contain commands that are consistent with a privacy irrelevant or privacy compatible function as described earlier. If a command does not match a command in the library, then the processor may change the state of a privacy indicator depending on the status currently shown by the privacy indicator is in (see FIG. 3).

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:
    obtaining, and storing in a destination in memory that is characterized as a trusted memory destination, audio or video data that is generated by a webcam while a visual privacy indicator associated with the webcam visually indicates a private state;
    identifying, while the visual privacy indicator associated with the webcam visually indicates the private state, a command based at least on the audio or video data;
    accessing a privacy policy that (i) includes a database of trusted memory destinations and (ii) identifies commands that are permissible and commands that are not permissible;
    determining, while the visual privacy indicator associated with the webcam visually indicates the private state, using the accessed privacy policy that (i) includes a database of trusted memory destinations and (ii) identifies commands that are permissible and commands that are not permissible, that the command that is identified based at least on the audio or video data involves providing audio or video data to a destination in memory that is not characterized as a trusted memory destination; and in response to determining, while the visual privacy indicator associated with the webcam visually indicates the private state, using the accessed privacy policy that (i) includes a database of trusted memory destinations and (ii) identifies commands that are permissible and commands that are not permissible, that the command that is identified based at least on the audio or video data involves providing audio or video data to the destination in memory that is not characterized as a trusted memory destination, causing the visual privacy indicator associated with the webcam to indicate a non-private state.

2. The method of claim 1, wherein determining, while the visual privacy indicator associated with the webcam visually indicates the private state, using the accessed privacy policy that (i) includes a database of trusted memory destinations and (ii) identifies commands that are permissible and commands that are not permissible, that the command that is determined based at least on the audio or video data involves providing audio or video data to a destination in memory that is not characterized as a trusted memory destination comprises identifying the command as restricted by a privacy policy that restricts performance of commands that involve providing audio or video data to a destination in memory that is not characterized as a trusted memory destination.

3. The method of claim 1, wherein:
the webcam is included in a mobile computing device, and
causing the visual privacy indicator associated with the webcam to indicate a non-private state comprises displaying, on an electronic display of the mobile computing device, a visual representation of the non-private state.

4. The method of claim 1, wherein:
the visual privacy indicator comprises a light emitting diode (LED),
the visual privacy indicator associated with the webcam visually indicates a private state by activating or de-activating the LED, and
causing the visual privacy indicator associated with the webcam to visually indicate a non-private state comprises activating the LED if the LED was de-activated to set the visual privacy indicator to visually indicate the non-private state, or de-activating the LED if the LED was activated to set the visual privacy indicator to visually indicate the non-private state.

5. The method of claim 1, wherein:
the webcam includes a microphone, and
identifying, while the visual privacy indicator associated with the webcam visually indicates the private state, a command based at least on the audio or video data comprises sensing, by the microphone, a voice command to access the audio or video data.

6. The method of claim 1, further comprising:
identifying, while the visual privacy indicator associated with the webcam visually indicates the private state, a command based at least on the audio or video data comprising receiving one or more images captured by the webcam and identifying that the one or more images indicate a gesture that is a command to access the audio or video data.

7. The method of claim 1, further comprising:
obtaining audio or video data that is generated by the webcam while the visual privacy indicator associated with the webcam visually indicates the private state comprises continuously or periodically obtaining audio or video data over a period of time.

8. The method of claim 1, wherein determining that the command that is identified based at least on the audio or video data involves providing audio or video data to a destination in memory that is not characterized as a trusted memory destination comprises determining that the destination that is not characterized as a trusted memory destination is not included in the database of trusted memory destinations.

9. A device, comprising:
one or more processors;
a webcam configured to capture audio or video data;
a user-perceptible visual privacy indicator; and
a memory device storing instructions that, when executed by the one or more processors, cause performance of operations comprising:
obtaining, and storing in a destination in memory that is characterized as a trusted memory destination, audio or video data that is generated by a webcam while a visual privacy indicator associated with the webcam visually indicates a private state;
identifying, while the visual privacy indicator associated with the webcam visually indicates the private state, a command based at least on the audio or video data;
accessing a privacy policy that (i) includes a database of trusted memory destinations and (ii) identifies commands that are permissible and commands that are not permissible;
determining, while the visual privacy indicator associated with the webcam visually indicates the private state, using the accessed privacy policy that (i) includes a database of trusted memory destinations and (ii) identifies commands that are permissible and commands that are not permissible, that the command that is identified based at least on the audio or video data involves providing audio or video data to a destination in memory that is not characterized as a trusted memory destination; and
in response to determining, while the visual privacy indicator associated with the webcam visually indicates the private state, using the accessed privacy policy that (i) includes a database of trusted memory destinations and (ii) identifies commands that are permissible and commands that are not permissible that the command that is identified based at least on the audio or video data involves providing audio or video data to the destination in memory that is not characterized as a trusted memory destination, causing the visual privacy indicator associated with the webcam to indicate a non-private state.

10. The device of claim 9, wherein determining, while the visual privacy indicator associated with the webcam visually indicates the private state, using the accessed privacy policy that (i) includes a database of trusted memory destinations and (ii) identifies commands that are permissible and commands that are not permissible, that the command that is determined based at least on the audio or video data involves providing audio or video data to a destination in memory that is not characterized as a trusted memory destination comprises identifying the command as restricted by a privacy policy that restricts performance of commands that involve providing audio or video data to a destination in memory that is not characterized as a trusted memory destination.

11. The device of claim 9, wherein:
the webcam is included in a mobile computing device, and
causing the visual privacy indicator associated with the webcam to indicate a non-private state comprises displaying, on an electronic display of the mobile computing device, a visual representation of the non-private state.

12. The device of claim 9, wherein:
the visual privacy indicator comprises a light emitting diode (LED),
the visual privacy indicator associated with the webcam visually indicates a private state by activating or de-activating the LED, and
causing the visual privacy indicator associated with the webcam to visually indicate a non-private state comprises activating the LED if the LED was de-activated to set the visual privacy indicator to visually indicate the non-private state, or de-activating the LED if the LED was activated to set the visual privacy indicator to visually indicate the non-private state.

13. The device of claim 9, wherein:
the webcam includes a microphone, and
identifying, while the visual privacy indicator associated with the webcam visually indicates the private state, a command based at least on the audio or video data comprises sensing, by the microphone, a voice command to access the audio or video data.

14. The device of claim 9, further comprising:
identifying, while the visual privacy indicator associated with the webcam visually indicates the private state, a command based at least on the audio or video data comprises receiving one or more images captured by the webcam and identifying that the one or more images indicate a gesture that is a command to access the audio or video data.

15. The device of claim 9, further comprising:
obtaining audio or video data that is generated by the webcam while the visual privacy indicator associated with the webcam visually indicates the private state comprises continuously or periodically obtaining audio or video data over a period of time.

16. A non-transitory computer-readable storage medium having instructions stored thereon that, when executed by one or more processors, cause performance of operations comprising:
obtaining, and storing in a destination in memory that is characterized as a trusted memory destination, audio or video data that is generated by a webcam while a visual privacy indicator associated with the webcam visually indicates a private state;
identifying, while the visual privacy indicator associated with the webcam visually indicates the private state, a command based at least on the audio or video data;
accessing a privacy policy that (i) includes a database of trusted memory destinations and (ii) identifies commands that are permissible and commands that are not permissible;
determining, while the visual privacy indicator associated with the webcam visually indicates the private state, using the accessed privacy policy that (i) includes a database of trusted memory destinations and (ii) identifies commands that are permissible and commands that are not permissible, that the command that is identified based at least on the audio or video data involves providing audio or video data to a destination in memory that is not characterized as a trusted memory destination; and
in response to determining, while the visual privacy indicator associated with the webcam visually indicates the private state, using the accessed privacy policy that (i) includes a database of trusted memory destinations and (ii) identifies commands that are permissible and commands that are not permissible, that the command that is identified based at least on the audio or video data involves providing audio or video data to the destination in memory that is not characterized as a trusted memory destination, causing the visual privacy indicator associated with the webcam to indicate a non-private state.

17. The non-transitory computer-readable storage medium of claim 16, wherein determining, while the visual privacy indicator associated with the webcam visually indicates the private state, using the accessed privacy policy that (i) includes a database of trusted memory destinations and (ii) identifies commands that are permissible and commands that are not permissible, that the command that is determined based at least on the audio or video data involves providing audio or video data to a destination in memory that is not characterized as a trusted memory destination comprises identifying the command as restricted by a privacy policy that restricts performance of commands that involve providing audio or video data to a destination in memory that is not characterized as a trusted memory destination.

18. The non-transitory computer-readable storage medium of claim 16, wherein:
the webcam is included in a mobile computing device, and
causing the visual privacy indicator associated with the webcam to indicate a non-private state comprises displaying, on an electronic display of the mobile computing device, a visual representation of the non-private state.

19. The non-transitory computer-readable storage medium of claim 16, wherein:
the visual privacy indicator comprises a light emitting diode (LED),
the visual privacy indicator associated with the webcam visually indicates a private state by activating or de-activating the LED, and
causing the visual privacy indicator associated with the webcam to visually indicate a non-private state comprises activating the LED if the LED was de-activated to set the visual privacy indicator to visually indicate the non-private state, or de-activating the LED if the LED was activated to set the visual privacy indicator to visually indicate the non-private state.

20. The non-transitory computer-readable storage medium of claim 16, wherein:
identifying, while the visual privacy indicator associated with the webcam visually indicates the private state, a command based at least on the audio or video data comprises receiving one or more images captured by the webcam and identifying that the one or more images indicate a gesture that is a command to access the audio or video data.

* * * * *